United States Patent [19]

Pritchett et al.

[11] Patent Number: 4,689,370

[45] Date of Patent: * Aug. 25, 1987

[54] HALOGENATED ETHYLENE-VINYL ACETATE-ISOBUTYLENE TERPOLYMERS

[75] Inventors: Ervin G. Pritchett; John M. Hoyt, both of Cincinnati, Ohio

[73] Assignee: National Distillers and Chemical Corporation, New York, N.Y.

[*] Notice: The portion of the term of this patent subsequent to Jun. 10, 2003 has been disclaimed.

[21] Appl. No.: 870,261

[22] Filed: Jun. 3, 1986

Related U.S. Application Data

[63] Continuation of Ser. No. 665,595, Oct. 29, 1984, Pat. No. 4,594,393.

[51] Int. Cl.$^4$ .................. C08F 220/16; C08F 8/20; C08F 8/22
[52] U.S. Cl. .................. 525/330.3; 525/355; 525/356; 526/331; 526/348.7; 264/83
[58] Field of Search .................. 525/330.3, 355, 356, 525/330.4; 526/331, 348.7; 264/83

[56] References Cited

U.S. PATENT DOCUMENTS

| | | | |
|---|---|---|---|
| 2,748,105 | 5/1956 | Becker et al. | 525/330.3 X |
| 4,277,579 | 7/1981 | Beck et al. | 525/330.4 X |
| 4,554,326 | 11/1985 | Kowalski et al. | 525/331.6 X |
| 4,594,393 | 6/1986 | Pritchett et al. | 526/916 X |

FOREIGN PATENT DOCUMENTS 2040960  9/1980  United Kingdom ............ 526/331

Primary Examiner—Joseph L. Schofer
Assistant Examiner—F. M. Teskin
Attorney, Agent, or Firm—Kenneth D. Tremain

[57] ABSTRACT

A halogenated ethylene-vinyl acetate-isobutene terpolymer is provided that has improved thermal stability.

3 Claims, No Drawings

HALOGENATED ETHYLENE-VINYL ACETATE-ISOBUTYLENE TERPOLYMERS

This is a continuation of copending application Ser. No. 665,595, filed on Oct. 29, 1984, now U.S. Pat. No. 4,594,393.

FIELD OF THE INVENTION

This invention relates to halogenated ethylene-vinyl acetate-isobutylene (EVAI) terpolymers having improved thermal stability properties.

BACKGROUND OF THE INVENTION

The production of ethylene-vinyl acetate (EVA) copolymers is well known in the art, and there is a continuing effort to find improvements in these copolymers, especially by terpolymerization of other terpolymerizable monomers. Stiles in U.S. Pat. No. 3,965,062 discloses, for example, that EVAI terpolymers exhibit increased melt indices in combination with lower stiffness and Vicat softening temperatures and are superior hot melt coating resins.

The halogenation of olefin polymers and copolymers is also well known in the art. Chlorinated polyethylenes, for example, are commercial products. Many of these products are elastomeric in nature since the residual crystallinity of polyethylene is gradually lost as chlorine is introduced into the polymer by the essentially random nature of the chlorination process. Accordingly, the relative molecular weight of chlorinated polyethylene elastomers is often judged from the Mooney viscosity, a measurement commonly employed in the rubber industry.

In U.S. Pat. No. 4,277,579, Beck, et al. show that the molecular weight of chlorinated ethylene polymers, including EVA copolymers, is increased by treatment with a small amount of a sulfur compound ($S_2Cl_2$, $SCl_2$, etc.) either before or during chlorination. As the degree of chlorination increases, Beck, et al. found that the Mooney viscosity of the chlorinated elastomeric products increased. Similar results were reported by Humbert, et al. [Die Makromolekulare Chemie, 175, 1597 (1974)] who determined that the degree of polymerization, i.e., polymer chain length, passes through a maximum and then decreases as the degree of chlorination of polyethylene increases, irrespective of whether the chlorination is done in solution or in dispersion. No sulfur compound was added in the chlorination processes of Humbert, et al. Finally, as will be disclosed hereinafter, in preparing certain chlorinated EVA elastomers with different degrees of chlorination for comparative purposes, we observed that Mooney viscosity rises significantly with increasing chlorine content of the chlorinated EVA elastomers, also without the addition of a sulfur compound.

Accordingly, it is an object of this invention to provide a halogenated and especially a chlorinated EVAI terpolymer.

It is another object of this invention to provide a halogenated and especially a chlorinated EVAI terpolymer that has superior heat stability, without added heat stabilizer, compared to that of chlorinated EVA copolymers of similar vinyl acetate content.

It is a further object of this invention to provide a halogenated and especially a chlorinated EVAI terpolymer exhibiting superior heat stability, without added heat stabilizer, at 200° C. as measured by the time required for the appearance of first yellow color.

These and other objects have been achieved according to the present invention.

Although Beck, et al. in U.S. Pat. No. 4,277,579 mention the chlorination of ethylene-butene copolymers, there is no disclosure therein of chlorinated EVAI terpolymers. In the present invention, a halogenated and especially a chlorinated EVAI terpolymer is provided which unexpectedly exhibits improved thermal resistance as compared to chlorinated EVA copolymers of similar vinyl acetate content prepared by the same synthesis procedures.

In the present invention, a halogenated and especially chlorinated EVAI terpolymer having improved thermal stability is provided wherein the amount of halogen does not exceed above about 25 weight percent based on the terpolymer. At halogen levels above about 25 weight percent, even with isobutylene present in the polymer, the improved thermal stability properties are not achieved.

DETAILED DESCRIPTION OF THE INVENTION

The EVAI terpolymers of the present invention are basically formed in accordance with known prior art techniques for the free radical catalytic formation of EVA copolymers at high temperature and high pressure. While batch, semi-continuous or continuous processes may be practiced, generally a high pressure autoclave resistant to the reactants with continuous flow is used. Any state of the art autoclave as is used in the prior art production of EVA copolymers can be used.

The preferred reaction conditions are: temperature of from about 225° to about 410° F.; pressure of from about 20,000 to about 30,000 psig; residence time of the reactants at reaction conditions of from about 25 to about 455 seconds.

The reactants may be fed into the autoclave either separately or they may be premixed and introduced as a combined feed stream. The elevated pressure required for the reaction is generally accomplished by injection of the ethylene reactant using positive displacement, reciprocating compressors, though other state-of-the-art techniques may be used. Ancillary pumping and introduction equipment is in accordance with state-of-the-art apparatus as is used for the high temperature/pressure production of EVA. The free radical catalyst used to initiate the reaction of ethylene, vinyl acetate and isobutylene to provide the EVAI terpolymer may be introduced separately or carried into the autoclave in the monomer feed stream.

The feed to the autoclave usually comprises purified ethylene, vinyl acetate, isobutylene and the free radical catalyst. The percentage of vinyl acetate in the feed is approximately equal to the percentage of vinyl acetate desired in the final product, with usually 1-3% excess vinyl acetate being present to account for unavoidable process losses. The amount of vinyl acetate in the EVAI compositions of the present invention may range from about 10 to about 75 weight percent, preferably from about 20 to about 60 weight percent of the total polymer.

The amount of ethylene in the composition of this invention may range from about 15 to about 80 weight percent and preferably from about 35 to about 65 weight percent of the total polymer.

Isobutylene behaves as a chain transfer agent in terpolymerization with ethylene and vinyl acetate in addition to functioning as a vinyl monomer and becoming incorporated into the terpolymer product. Accordingly, as the amount of isobutylene fed to the autoclave is increased, the molecular weight of the terpolymer decreases; in other words, relatively higher isobutylene incorporation implies a penalty in molecular weight. In fact, the preferred EVAI terpolymers of this invention are for the most part viscous fluids which exhibit a Brookfield viscosity of between about 25 and 25,000 centipoise at 140° C. A product with a viscosity of between 150 and 10,000 cps at 140° C. is preferred.

Inasmuch as isobutylene is incorporated comparatively sluggishly into the terpolymer product, relatively more of this monomer must be fed into the autoclave than will be incorporated into the EVAI terpolymer product. Generally, the isobutylene feed rate will be from about 0.1 to about 5 times the vinyl acetate feed rate, the isobutylene incorporation then ranging from about 0.05 to about 20 weight percent broadly, and 0.5 to about 15 weight percent preferred.

A free radical catalyst is introduced with the reactants. Any free radical catalyst or mixture thereof which is active at the temperature of reaction may be used, with representative free radical catalysts being benzoyl peroxide, azobisisobutyronitrile, ditertiary-butyl peroxide, tertiary-butyl perbenzoate, tertiary-butyl peroctoate, tertiary-butyl perpivalate, diisopropyl peroxydicarbonate, tertiary-butyl perisobutyrate, etc., and mixtures thereof. The amount of catalyst is in accordance with high temperature/high pressure prior art processes for forming EVA copolymers and will generally be from about 0.01 to about 3.0% based on the total weight of reactants. Lesser amounts, though useful, result in somewhat lower process efficiency and greater amounts are economically impractical since often expensive catalyst removal techniques will then be required. As a general rule, the minimum amount of catalyst required will be used.

The process conditions used are always correlated with the final product characteristics desired. For on-line commercial processing, it is easiest to fix the ethylene and VA proportions and thereafter to vary the isobutylene percentages until (in accordance with an on-line analysis) the final product provides the desired properties.

After the monomeric reactants are subjected to process conditions for the necessary amount of time, the solid polymeric product is removed via a pressure letdown valve to product recovery. Ethylene pressure suffices for removal. Unreacted ethylene, VA and isobutylene can be recycled, if desired, after flashing from the product.

After removal of unreacted monomers by a standard art technique, the product may thereafter be subjected to conventional processings, for example, granulation, blending with inorganic or organic pigments, antioxidants, etc., in a manner known to the art.

The process of the present invention broadly relates to the halogenation of the aforementioned terpolymers and includes in addition to the chlorination of such copolymers, the addition of fluorine, iodine and bromine to such terpolymers. Halogenation is carried out by contacting the aforesaid polymers with a halogen or a halogen donor, such halogen donors being well known in the art such as for example, chlorine, fluorine, bromine, iodine, hydrogen chloride, hydrogen fluoride, hydrogen bromide and hydrogen iodide inter alia. The quantity of halogenating agent or halogen added to the aforesaid polymers and the length of time for contacting such polymers with the halogen or halogenating agents will be adjusted so that the aforesaid polymers will have added thereto the quantity of halogen as defined herein. The time for the reaction, the temperatures and the concentration at which the aforesaid halogen or halogenating agents are added are interdependent and are readily adjusted by a person having ordinary skill in the art so that the polymers that are thus treated will have the requisite amount of halogen added thereto.

The EVAI terpolymers of the invention may be chlorinated in solution, in suspension or neat, without a solvent or suspending agent, when the polymer is sufficiently fluid. It is also possible, where the aforesaid polymers can be reduced to powders, to chlorinate the said powders in a fluidized bed, using neither a solvent nor a suspending agent.

Suitable solvents or suspending agents are, for example, halogenated hydrocarbons such as methylene chloride, chloroform, carbon tetrachloride, tetrachloroethane, 1,1,2-trichloro-1,2,2-trifluoroethane, chlorobenzene, etc.

Chlorine or chlorine donors may be used to effect the chlorinations; use of chlorine is preferred. An amount of chlorine at least sufficient to accomplish the desired degree of chlorination of the polymer must be used, but it is usually advantageous to employ an excess of chlorine, up to 5 times the amount corresponding to the desired amount of chlorination.

The temperature at which the chlorinations are performed is conveniently selected as the boiling point or reflux temperatures of the solvent or suspending agent, but lower temperatures below the reflux temperature may be used. Broadly, the temperature of chlorination will be between −40° C. and 150° C.; a temperature of 35° C. to 120° C. is preferred.

Normally, the chlorination process is carried out at atmospheric pressure, but high pressures of chlorine may be employed, up to about 150 psi.

The EVAI terpolymers of the invention, as indicated previously, may be chlorinated without a solvent and the temperature of the chlorination is conducted at the melting point of the aforesaid copolymers or terpolymers to temperatures above said melting points and up to about 150° C. In this respect, it should be noted that the EVAI terpolymer is a viscous liquid at room temperature and as the temperature increases, the terpolymer becomes even more fluid and lends itself more readily at such elevated temperatures to a solventless chlorination process. One of the advantages of conducting the process without a solvent is that recovery of the chlorinated terpolymer or copolymer is simplified in that chlorine which is not added to the copolymer or terpolymer may be removed from the melt by blowing an inert gas through the molten chlorinated copolymer or terpolymer at which point unused chlorine and by-product HCl will be carried off in the stream of inert gas passed through the terpolymer or copolymer thus chlorinated.

Chlorinated polyethylene, chlorinated ethylene copolymers, chlorinated rubber, as well as chlorine-containing polymers normally produced by polymerization of chlorine-containing monomers, for example, polyvinyl chloride and vinyl chloride copolymers, are well-recognized in the art as being thermally unstable materials. Before they can be successfully processed and molded into useful articles, it is necessary to add heat-stabilizing substances to them. Chlorinated ethylene-vinyl acetate copolymers are no exception to this rule: on exposure to excessive amounts of heat, they can evolve both acetic acid and hydrogen chloride And, although heat stabilizers added before processing will improve heat stability, it would obviously be advantageous to have an ethylene-vinyl acetate type of copolymer composition, which, when chlorinated, will itself exhibit a thermal stability superior to that of conventional chlorinated ethylene-vinyl acetate copolymers.

It is, of course, obvious to those skilled in the art that additional heat stability can be imparted to the chlorinated EVAI terpolymers of this invention, which themselves exhibit superior heat stability, by adding conventional heat stabilizers used for polyvinyl chloride, chlorinated polyethylene, etc.

The chlorinated EVAI terpolymers of this invention have utility in protective coatings, in adhesives and as additives for imparting fire retardancy.

The products and process of this invention are hereinafter illustrated by the following examples. In the examples, vinyl acetate content in the EVA copolymers and EVAI terpolymers used as starting material for chlorination was determined by saponification and in some instances by carbon-13 nuclear magnetic resonance (C-13 nmr). Isobutylene content was determined by C-13 nmr; ethylene content was arrived at by difference. Chlorine content of the chlorinated polymers was measured by the Schoeniger technique (ASTM Method E 442-74) and checked by C-13 nmr.

Relative molecular weights were measured by melt flow rate (abbreviated MFR) according to ASTM Method D-1238, condition B. Mooney viscosity was determined in accordance with ASTM Method D 1646-68.

A Brookfield thermosel viscometer was used to measure melt viscosities of the fluid EVAI terpolymers. Relative thermal stabilities of chlorinated EVA and EVAI polymers and of comparative chlorine-containing polymers were measured by heating specimens placed on a white background on a Fisher-Johns melting point apparatus held at 200° C. and noting the time in minutes for the first yellow discoloration to appear in the specimen.

EXAMPLE 1

Synthesis of EVA Copolymers

Part A

Copolymer No. 1

The copolymer was synthesized in a continuous high pressure plant of the type employed in the commercial production of low density polyethylene, but with suitable modification for copolymerizing vinyl acetate. An organic peroxy compound was used as a source of free radicals for copolymerization initiation. The copolymerization temperature was about 265° F., the pressure about 30,000 psig. Vinyl acetate monomer was introduced into the synthesis at a rate sufficient to yield a copolymer containing about 45 weight percent of incorporated vinyl acetate. After devolatilization treatment and pelletization, the copolymer had a melt flow rate of about 1.

Copolymer No. 2

EVA copolymer No. 2 was synthesized as described for copolymer No. 1, with the exception that the synthesis temperature was about 250°–310° F., the synthesis pressure was about 30,000 psig, and vinyl acetate monomer was introduced at a rate sufficient to produce an EVA copolymer product containing about 60–65 weight percent of incorporated vinyl acetate. Following devolatilization treatment, the copolymer was collected and stored in covered 5-gal. pails. The copolymer had a melt flow rate of about 10–15 g/10 min.

Part B

Synthesis of an EVAI Terpolymer

The terpolymer was synthesized in the manner and in the plant described in Part A, above. Synthesis temperature was about 325°–350° F.; the pressure 20,000 psig. Vinyl acetate monomer was introduced into the synthesis at a rate sufficient to yield a terpolymer product containing 36±2.5 weight percent of incorporated vinyl acetate, isobutylene was simultaneously introduced into the synthesis at such a rate that the terpolymer product had a Brookfield melt viscosity of 250–350 cps at 140° C. After devolatilization, the terpolymer was collected and stored in covered 5-gal. pails.

A specimen of terpolymer synthesized as described above was examined by C-13 nmr. From the nmr spectrum it was established that the terpolymer specimen contained 37.8 weight percent vinyl acetate. In addition, the nmr spectrum showed fairly intense peaks due to incorporation of isobutene, viz gem-dimethyl branches $-C(CH_3)_2-$. The amount of these was calculated to be roughly 32 branches per 1,000 carbon atoms (10.1 weight percent isobutylene).

EXAMPLE 2

This example describes the procedure used to chlorinate the EVA copolymers and EVAI terpolymers prepared by the methods disclosed in Example 1.

The chlorinations were performed in a fume hood, in laboratory all-glass equipment. Contact with metal was avoided. Small-scale experiments (10 g of polymer) were done in side-arm test-tube reactors (agitated only by the chlorine stream); larger amounts of the polymers (100 g) were chlorinated in a 1- or 2-liter, four-necked glass resin flask.

Chlorine gas was introduced from a supply cylinder through a dip-tube, underneath the surface of the solution of the polymer or the copolymer itself (EVAI terpolymer) in the chlorination reactor. Unreacted chlorine and by-product hydrogen chloride passed from the reactor through two traps with 40% aqueous sodium hydroxide solution. The resin flask reactor was also equipped with a stirrer (teflon blade), condenser, heating mantle and thermometer; a water-condenser was employed during polymer dissolution, before chlorination, but was replaced with a cold-finger condenser containing solid carbon dioxide during chlorination. Chlorine addition was controlled by observing the bubbling rate of chlorine through the reaction mass and the reaction time.

When the desired degree of chlorination was judged to have been reached, the chlorine stream was shut off. Heat to the reactor was shut off and nitrogen was passed through the system to transfer remaining chlorine and hydrogen chloride to the alkaline trap. Thereafter, the reactor was pumped down with a water aspirator for about one hour and then placed in a vacuum oven at 50° C. to dry the chlorinated polymer to constant weight.

Table 1 summarizes chlorination experiments done on comparative EVA copolymers containing 43.5 and 62.5 weight percent incorporated vinyl acetate. As copolymer No. 1, an elastomer initially containing 43.5 weight percent vinyl acetate and with a Mooney viscosity of 15 is chlorinated, the Mooney viscosity increases to 46 at a chlorine content of 21.2 weight percent. This chlorinated elastomer was completely soluble in the $CH_2Cl_2$ chlorination solvent. As the degree of chlorination is increased further, elastomeric properties are lost and at about 55% incorporated chlorine, a hard brittle material is recovered.

Table 2 contains three chlorination experiments done on an EVAI terpolymer originally containing 37.8 weight percent of vinyl acetate and 10% isobutylene. In Experiment E, no chlorination solvent was employed, nor was one needed, since the EVAI terpolymer itself was fluid enough to be chlorinated neat at 85°–90° C. At about 15 weight percent of combined chlorine, the chlorinated EVAI products were still viscous fluids, but at 52 weight percent chlorine, the product was solid.

EXAMPLE 3

In this example, the heat stability of the chlorinated EVAI terpolymers of this invention is compared with the heat stability of comparative chlorinated EVA copolymers and with that of selected chlorine-containing polymers available commercially. No heat stabilizer was added to the chlorinated EVAI terpolymers of the invention, nor to the comparative chlorinated EVA copolymers. Results are tabulated in Table 3, in terms of the time in minutes required for a given specimen to exhibit a faint yellow discoloration at 200° C.

It is evident that chlorinated EVAI terpolymers of this invention containing about 15 weight percent chlorine exhibit unexpectedly high thermal stability as compared to chlorinated EVA copolymer of similar composition (compare products of Experiments E and F with those of A, B and C). However, at significantly higher chlorine content (product of Experiment G, 52% chlorine) the chlorinated EVAI terpolymers have lost their improved thermal stability.

TABLE 1

CHLORINATION OF ETHYLENE-VINYL ACETATE COPOLYMERS
100 g of copolymer taken for each chlorination
All chlorination done at solvent reflux temperature

| | EVA Copolymer | | | Chlorination Conditions | | | Chlorinated Product | | | |
| | | | | Solvent | | | | | Mooney Viscosity | |
| Experiment No. | No. | Wt. % Vinyl Acetate | MFR, g/10 min | Formula | Amt., ml | Time hrs | Amt. Recovered, g | Wt. % Cl | ML(1 + 4) @ 100° C. | Appearance |
|---|---|---|---|---|---|---|---|---|---|---|
| — | Copolymer 1 | 43.5 | 0.89 | — | — | — | — | — | 15 | colorless elastic pellets |
| A | Copolymer 1 | 43.5 | 0.89 | $CF_2ClCFCl_2$[1] | 450 | 4 | 116 | 15.2 | 27 | clear, colorless, stiff elastomer |
| B | Copolymer 1 | 43.5 | 0.89 | $CH_2Cl_2$ | 450 | 2 | 129.6 | 21.2 | 46 | clear, colorless; elastic, rubbery |
| C | Copolymer 1 | 43.5 | 0.89 | $CH_2Cl_2$ | 500 | 20 | 250.5 | 53.7 57.6 | — | slightly off-white; clear, hard brittle |
| D | Copolymer 2 | 62.5 | 10 | $CF_2ClCFCl_2$ | 450 | 2 | 120 | 18 | — | colorless, rubbery, very flexible |

[1]EVA only slowly dissolves in $CF_2ClCFCl_2$ and the chlorinated product soon begins to precipitate.

TABLE 2

CHLORINATION OF AN ETHYLENE-VINYL ACETATE-ISOBUTYLENE TERPOLYMER
Terpolymer composition, wt. %: ethylene, 52.1; vinyl acetate, 37.8; isobutylene, 10.1
Terpolymer melt viscosity, 402 cps @ 140° C.

| | | Chlorination Conditions | | | | Chlorinated Product | | |
| | Amt. of | Solvent | | | | | | |
| Experiment No. | Terpolymer taken, g | Formula | Amt., ml | Temp. °C. | Time, hrs | Amt. Recovered, g | Wt. % Cl | Appearance |
|---|---|---|---|---|---|---|---|---|
| E | 9.54 | None; Neat Terpolymer | — | 85–90 | 2 | 11.5 | 14.4 | lt. tan, viscous |
| F | 9.98 | $CH_2Cl_2$ | 25 | reflux | 1 | 11.7 | 15.5 | lt. yellow, viscous |
| G | 102 | $CH_2Cl_2$ | 450 | reflux | 35–38 | 186 | 52 | colorless, brittle foamed product |

TABLE 3

THERMAL STABILITY TESTS AT 200° C.

| | Composition, Wt. % Before Chlorination | | | Chlorine Content After | Time to First | |
| Product of Experiment | Ethylene | Vinyl Acetate | Isobutylene | Chlorination, Wt. % Cl | Yellowness @ 200° C., min | Remarks |
|---|---|---|---|---|---|---|
| A | 56.5 | 43.5 | 0 | 15.2 | 6–7 | — |
| B | 56.5 | 43.5 | 0 | 21.2 | 2 | — |
| C | 56.5 | 43.5 | 0 | 53.7 57.6 | 2.75 | frothed |
| D | 37.5 | 62.5 | 0 | 18 | 0 | yellow cast, darkened rapidly |

TABLE 3-continued

| | THERMAL STABILITY TESTS AT 200° C. | | | | | |
|---|---|---|---|---|---|---|
| | Composition, Wt. % Before Chlorination | | | Chlorine Content After | Time to First | |
| Product of Experiment | Ethylene | Vinyl Acetate | Isobutylene | Chlorination, Wt. % Cl | Yellowness @ 200° C., min | Remarks |
| E | 52.1 | 37.8 | 10.1 | 14 | 35 | — |
| F | 52.1 | 37.8 | 10.1 | 15.5 | 25 | — |
| G | 52.1 | 37.8 | 10.1 | 52 | 2 | — |
| Comparative Polymers | | | | | | |
| Chlorinated Rubber[1] | | | | | | |
| Parlon ® S-5 | | | | (67) | 7+ | — |
| Parlon ® S-330 | | | | (67) | 12 | — |
| Polyvinyl Chloride[2] | | | | (56.8, Calc.) | 6 | — |

[1]Hercules, Inc.; according to the manufacturer's brochure, these products contain an epoxy-type stabilizer.
[2]B. F. Goodrich, Geon 103-EP, unstabilized.

Although the invention has been described by reference to some embodiments, it is not intended that the novel process for halogenating and especially chlorinating the EVAI polymers and the products produced by such process be limited thereby but that modifications thereof are intended to be included as falling within the broad spirit and scope of the foregoing disclosure and the following claims.

What is claimed is:

1. An ethylene-vinyl acetate copolymer comprising an ethylene-vinyl acetate-isobutylene terpolymer, wherein said ethylene is present in a concentration of from about 15 to about 80 weight percent; said isobutylene is present in a concentration of from about 0.05 to about 20 weight percent; and said vinyl acetate is present in a concentration of from about 10 to about 75 weight percent, said percentages based on the total weight of said terpolymer, said terpolymer halogenated such that said halogen is present in a concentration of from about 5 to about 25 weight percent, based on the total weight of said halogenated terpolymer.

2. A copolymer in accordance with claim 1 wherein the halogen is chlorine.

3. A copolymer in accordance with claim 1 wherein said ethylene is present in a concentration of from about 35 to about 65 weight percent; said vinyl acetate is present in a concentration of from about 20 to about 60 weight percent; and said isobutylene is present in a concentration of about 0.5 to about 15 weight percent; said percentages based on the total weight of said terpolymer prior to halogenation.

* * * * *